United States Patent [19]
Johnson

[11] Patent Number: 4,742,511
[45] Date of Patent: May 3, 1988

[54] METHOD AND APPARATUS FOR ROUTING PACKETS IN A MULTINODE COMPUTER INTERCONNECT NETWORK

[75] Inventor: Douglas A. Johnson, Carrollton, Tex.

[73] Assignee: Texas Instruments Incorporated, Dallas, Tex.

[21] Appl. No.: 744,583

[22] Filed: Jun. 13, 1985

[51] Int. Cl.⁴ .............................................. H04J 3/16
[52] U.S. Cl. ......................................... 370/94; 370/88
[58] Field of Search ...................... 370/94, 86, 60, 89, 370/88

[56] References Cited

U.S. PATENT DOCUMENTS

| | | | |
|---|---|---|---|
| 4,320,500 | 3/1982 | Barberis et al. | 370/94 |
| 4,399,531 | 8/1983 | Grande et al. | 370/94 |
| 4,550,397 | 10/1985 | Turner et al. | 370/94 |
| 4,672,374 | 6/1987 | Mori et al. | 370/86 |

*Primary Examiner*—Douglas W. Olms
*Attorney, Agent, or Firm*—Kenneth C. Hill; Thomas W. DeMond; Melvin Sharp

[57] ABSTRACT

A method for routing user packets in a multinode interconnect network is disclosed. Each packet has a destination node (10). Each node (10) is connected by input and output lines (12) and has a plurality of packet storage links (34) and (56–60). Each link (34) and (56–60) is connected to an input line (18–24) and has a number of packet storage buffers (38–44) and is connectable to any of the node's output lines (26–32). During operation node (10) uses a set of routing instructions and a look-up table (192) to determine which user packets are sent out on which output lines (26–32). The routing rules determine which output line is connected to the shortest path to the destination node, and ensure that the node (10) will always have an empty storage buffer (38–44) for each input line (18–24) for receiving further user packets.

13 Claims, 5 Drawing Sheets

METHOD AND APPARATUS FOR ROUTING PACKETS IN A MULTINODE COMPUTER INTERCONNECT NETWORK

TECHNICAL FIELD OF THE INVENTION

This invention relates generally to multinode computer interconnect networks, and more particularly relates to a method and apparatus for routing packets in such networks in order to achieve a high routing efficiency and minimum grid lock problems.

BACKGROUND OF THE INVENTION

A computer system includes a number of separate components such as memory, processors (CPUs), and input/output devices. All of these components must be able to communicate with each other. The most common conventional means of intercommunication has been by the use of buses and crossbars.

Recent advancements in the electronics industry are causing bus and crossbar interconnect techniques to be insufficient. Very large scale integration (VLSI) makes it possible to form a small, low speed processor on a single chip. It is now therefore cost effective to construct a large, high speed processor by ganging many single chip processors. When this is done, however, the interconnect between the processors becomes a major bottleneck in attempting to increase the overall efficiency of the processor.

Ideally, the interconnect must be able to supply sufficient bandwidth and to connect a large number of processors together at a reasonable cost. It is also highly desirable that the interconnect be expandable, as by adding processors to increase system power. While expanding the network with further processors or devices, it is desirable that the interconnect bandwith expands with it without excessive cost and without a required purchase of initially unneeded hardware to support the future expansion.

Conventional bus and crossbar interconnection techniques do not meet these requirements. A bus has only electrical limitations on the number of processors it can service, but has a fixed bandwidth. The bandwidth of a crossbar increases with the number of processors which it interconnects, but its cost grows as the square of the number of processors and is not expandable at all without initial overdesign.

In local area computer networks, the bandwidth requirements are usually low enough that a bus will suffice, but buses are not fault tolerant. Failure of the bus will cause failure of the entire network. A crossbar is generally not feasible for a local area computer network because of the $N^2$ cost growth relation. The fault tolerance of a crossbar is only slightly greater than the fault tolerance of a bus, as each pair of nodes inside a crossbar has only a single link between them. Therefore, failure of the link prevents any communication between the two nodes in the crossbar. Neither crossbar nor bus interconnection techniques allow local area computer networks to be easily expandable for the reasons discussed above.

More recently, expandability and fault tolerance have been somewhat imperfectly achieved by the employment of packet-switching, rather than circuit-switching, techniques. In packet switching, a user's logical message is separated (disassembled) and transmitted in multiple user packets. The packet may contain user data and control data, all of which are switched as a composite whole. Each packet of the user data generally contains a header that has information as to the packet's final destination.

Packet switching often is used in a multinode system with several alternative paths between the origin of a packet and its final destination. The use of packet switching and multiple communication paths allows the bypassing of failed switches or lines and, where packet switching control is distributed at each node, allows expansion of the system without initial overdesign. However, the control software of such nodes has generally not been flexible in adapting to faults in the network.

Packet switching in a multinode interconnect system has other problems as well. One of these is load balancing. Where routing rules are chosen such that a packet is sent on the path requiring the least nodal travel distance to reach its destination, often certain paths are selected at a much greater frequency than other paths, causing an imbalance of loading on the system and possible static deadlock. Another problem found in multinode packet switching systems is dynamic deadlock. Dynamic deadlock is caused when a node "forces" a packet out of the node in order to free a pocket storage buffer for the receipt of another packet. The packet may be forced out along an output line that moves it away from the packet's destination. With a poor set of routing rules, the packet may circulate endlessly, resulting in dynamic deadlock.

Therefore, a need has arisen for a multinode packet switching network which has a minimum logical distance between nodes and that is operated by a set of routing rules to prevent static and dynamic deadlock. Further, a need exists for a packet switching network that is extremely fault tolerant and provides a self-repairing distributed control over the packet switching function.

SUMMARY OF THE INVENTION

The present invention discloses a method and apparatus for routing user packets in a multinode computer interconnect network. Each user packet has an identifier indicating its destination node. Each node is connected by input and output lines to a plurality of other nodes. Each node has a plurality of links, with each link being connected to an input line, having a number of packet storage buffers and being selectively connectable to any output line.

During operation, the node receives a number of information packets on its input lines. The information packets are each stored in a buffer. Next, the node senses the destination of each packet and determines the preferred output line for each packet by consulting a look-up or routing table. The preferred output line is defined as being a part of a path having the shortest nodal travel distance to the destination node. Once the preferred output line for each packet and the corresponding nodal travel distance have been determined, one packet is selected among the buffers of each link that has the shortest nodal travel distance. These packets, one from each link, are then assigned, in increasing order of their associated nodal travel distances, to their respective preferred output lines if the output line for such a packet has not already been assigned.

If any output lines thereafter remain unassigned to a packet, the node identifies which links would still be full, i.e., would still have no empty buffers, after transmission of the previously assigned packets. For each prospective full link, a stored packet is assigned to an output line until the unassigned lines are exhausted or until all links no longer remain prospectively full. If after the above step there are still unassigned output lines, any remaining unassigned packets may be assigned to their respective preferred output lines until no unassigned output lines remain that are the preferred line for an unassigned packet. After stored packets have been selected in this manner, the assigned packets are transmitted.

BRIEF DESCRIPTION OF THE DRAWINGS

For a more complete understanding of the present invention and the advantages thereof, reference is now made to the following description, taken in conjunction with the accompanying Drawings in which.

DETAILED DESCRIPTION OF THE INVENTION

Although the routing system of the invention can be used in any multinode interconnect network, preferably a hypertoroidal interconnect scheme is employed. As used herein, "hypertoroid" describes a class of network organizations where each node has 2n connections and is a member of n rings. The number of ring-dimensions, or conceptual ring families in which the network rings are formed, is also n.

Figure 1:
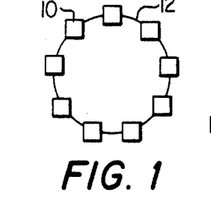
FIG. 1 is a schematic representation of a one-dimensional hypertoroidal multinode system interconnect.

FIG. 1 illustrates a hypertoroid in one ring-dimension, that is, n=1. Each node 10 has only two (=2n) sets of input/output lines 12, and is a member of only one (=1n) ring. A hypertoroid of one dimension is only used with a small number of nodes, as it offers only one alternative path for the switching of packets.

Figure 2:
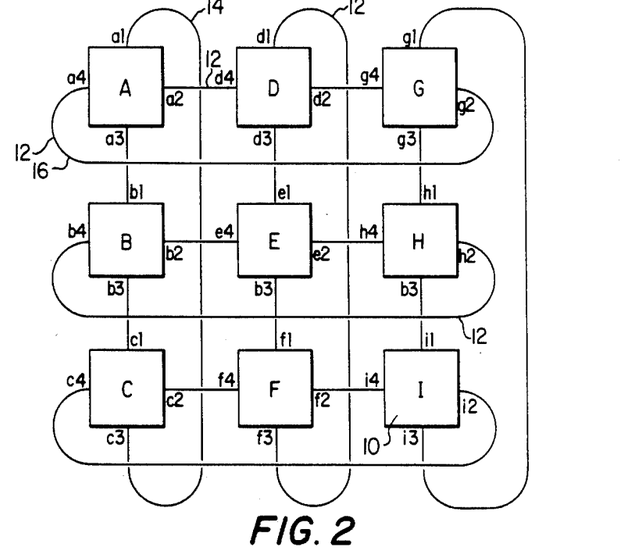
FIG. 2 is a schematic diagram of a two-dimensional hypertoroidal multinode system interconnect.

FIG. 2 shows a hypertoroidal network of nine nodes and two ring-dimensions. The invention may also be used for hypertoroidal networks having three or more ring-dimensions and a large number of nodes, but the structure shown in FIG. 2 will be used for purposes of illustrating the invention. Each node 10 has been labeled with a capital letter for purposes of discussion, although in actual practice the node identity would of course be specified by a digital sequence. In the illustrated two-dimensional case, each node 10 is connected to adjacent nodes by four full duplex lines 12. Each line 12 connects two nodes together and for purposes of discussion is labeled twice. Thus, for node A, the line connecting node A to node B is line a3 and is also line b1. Each node 10 is a member of two rings, each ring residing in a different ring-dimension. Node A is a member of ring 14 and ring 16. Ring 14 includes Nodes B and C and ring 16 includes Nodes D and G.

The hypertoroid has a number of advantages over other networks. It provides a large degree of expandability while maintaining short distances between nodes. Hypertoroidal structure provides multiple paths between nodes, thus allowing automatic load balancing and a fail-soft capability. Simulation has shown the hypertoroid to be the network that delivers the highest bandwidth for a given number of nodes and links.

The hypertoroidal network's relatively short average logical (nodal) distance between originating node and destination node has a strong affect on both delivery time and maximum delivered bandwidth. As the hypertoroidal network is expanded, the average distance between nodes grows slowly. Doubling the number nodes on a two-dimensional network causes only a $\sqrt{2}$ increase in average internodal distance.

Figure 3:
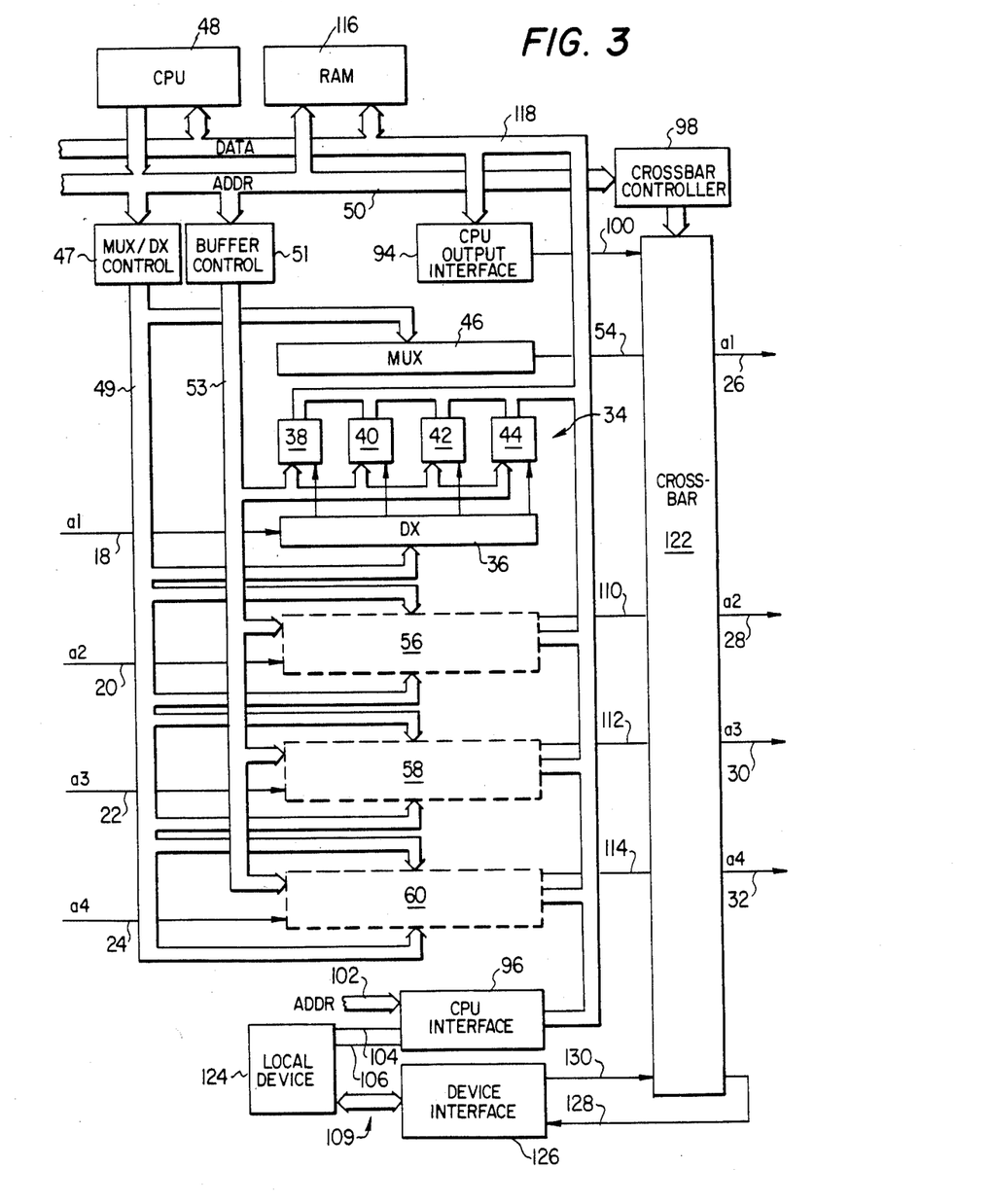
FIG. 3 is a schematic electrical diagram showing the interior structure of one of the nodes of FIG. 2.

FIG. 3 shows in a schematic manner the internal structure of Node A in the network shown in FIG. 2. In FIG. 2, Node A is connected to surrounding nodes by a set of full duplex lines 12, which include lines a1, a2, a3 and a4. FIG. 3 shows that lines a1, a2, a3 and a4 are each further divided into input lines 18, 20, 22 and 24 and output lines 26, 28, 30 and 32, respectively. Input lines 18–24 and output lines 26–32 are here shown separated for purposes of clarity.

Input line 18 is connected to a link 34 that comprises a demultiplexer 36, a plurality of packet storage buffers 38–44 and a multiplexer 46. A multiplexer/demultiplexer control 47 controls multiplexer 46 and demultiplexer 36 through a control bus 49. The operation of buffers 38–44 is controlled by a buffer controller 51 through a control bus 53. A CPU 48, which can be a microprocessor, is connected to MUX/DX controller 47 by an address bus 50. Address bus 50 also delivers instructions to buffer controller 51 from CPU 48.

Figure 4:
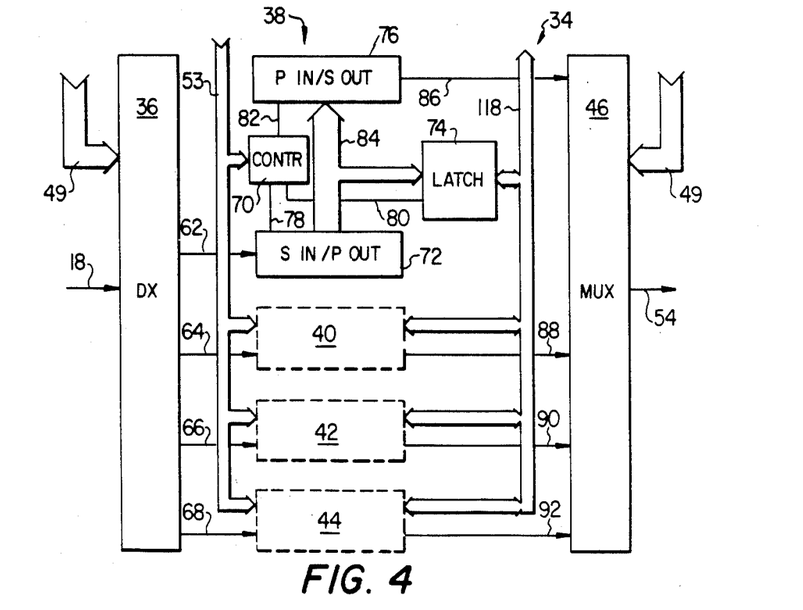
FIG. 4 is a schematic detail of FIG. 3, showing the internal structure of a link.

FIG. 4 shows link 34 in more detail. Control bus 49 communicates instructions from MUX/DX controller 47 (FIG. 3) to serial one-of-four demultiplexer 36. In accordance with these instructions, demultiplexer 36 will switch an incoming packet on input line 18 onto one of four buffer input lines 62, 64, 66 and 68. Concurrently, buffer controller 51 (FIG. 3) tells one of buffers 38–44 to receive a packet appearing on a respective input line 62–68.

The internal structure of buffer 38 is shown in detail in FIG. 4. A controller 70 receives instructions from control bus 53, and itself controls elements 72–76 through control lines 78–82. A signal on line 78 enables serial in/parallel out shift register 72 to receive a packet on line 62, which is transmitted between nodes in serial form. Element 72 makes the packet available in parallel form at buffer bus 84. Controller 70 enables a routing header of the packet to be latched in a buffer 74 by a signal on line 80. Buffer 74 makes the header, including such items as destination node (in a user packet) or originating node and node distance number (in a node distance packet) available at a data bus 118 to be read by CPU 48.

A parallel in/serial out shift register 76, when enabled by a signal on control line 82 from controller 70, converts the packet back to serial form and transmits it on a buffer serial output line 86. Controller 70 enables register 72 to receive incoming packet at the same time that register 76 in enabled to transmit an outgoing packet on line 86. Line 86 is connected to one-of-four multiplexer 46, which switches one of output lines 86–92 to interior output line 54 according to instructions received on control bus 49.

The structure of buffers 40–44 replicates the structure of buffer 38.

Referring back now to FIG. 3, multiplexer 46 transmits outbound packets on interior output line 54 to a crossbar 122. Input lines 20–24 connect to the demultiplexers (not shown) of links 56, 58 and 60. Links 56–60 are organized in the same manner as link 34. Outbound packets from links 56–60 are transmitted on interior output lines 110, 112 and 114, respectively, to crossbar 122.

CPU 48 communicates with a random access memory (RAM) 116 by data bus 118. Data bus 118 also allows communication between CPU 48 and MUX/DX controller 47, main buffer controller 51, a CPU output interface element 94 and a local CPU interface 96.

CPU 48 reads the header information from buffer 74 and analagous elements in order to determine which of the user packets are closest to their destinations, and which output line 26–32 is on the shortest path to the destination node. CPU 48 makes these comparisons with the assistance of a look-up table, later described, stored in RAM 116. A Write ability back to buffer 74, et al., is necessary for the transmission of incremented node distance packets in connection with look-up table generation at the beginning of network operation, as will be later described.

CPU 48 selects one packet stored in link 34, one packet stored in link 56, one packet stored in link 58 and one packet stored in link 60 for transmission upon the next system clock pulse. By address bus 50, CPU 48 instructs a crossbar controller 98 as to which interior output line 54, 110, 112, or 114 should be electrically connected with which exterior output line 26, 28, 30, or 32. These instructions are in turn relayed by controller 98 to crossbar 122 on a crossbar bus 120.

CPU output interface 94 allows CPU 48 to "handshake" with other nodes through a serial message line 100. Interface 94 transmits an acknowledgement signal or error message on an appropriate output line (if the received packet is known to be faulty through error checking) upon receipt of a packet into one of links 34, 56–60. The failure of the sending node to receive an acknowledgement from interface 94 sets up a fault detection procedure later described.

Each node A-I in the network may have one or more local devices 124 connected to it. These devices can be processors, memories, or input/output devices. Device 124 is connected to node 10 by an interface 126. Interface 126 is in turn connected to crossbar 122 by a local device input line 128 and a local device output line 130. As it receives knowledge of a locally generated packet's destination node from a local CPU interface 96 through bus 118, CPU 48 can instruct crossbar 122 to transmit the contents of interface 126 on any output lines 26–32. CPU 48 also can instruct crossbar 122 (through controller 98) to transmit a stored packet with a destination node equal to A (the home node) to interface 126 on line 128. Interface 96 receives the destination node of a packet to be transmitted on bus 102, and a ready-to-send signal and other information from device 124 on lines 104, 106. Local device 124 and interface 126 are connected by a bus 109.

It should once again be noted that while the present invention is illustrated as a two-dimensional hypertoroidal case, the structure of node 10 can be easily expanded to accommodate additional ring-dimensions. Each additional ring-dimension requires two additional input lines, two additional output lines, and two additional links. The remaining components of node 10 would be functionally the same. The number of buffers in each link could be increased or decreased, although at least four buffers per link are preferred. The number of hypertoroid dimensions and number of data packet storage buffers are selected according to desired bandwidth, degree of utilization of the network and overall internode transmission rate.

Figures 5, 6:
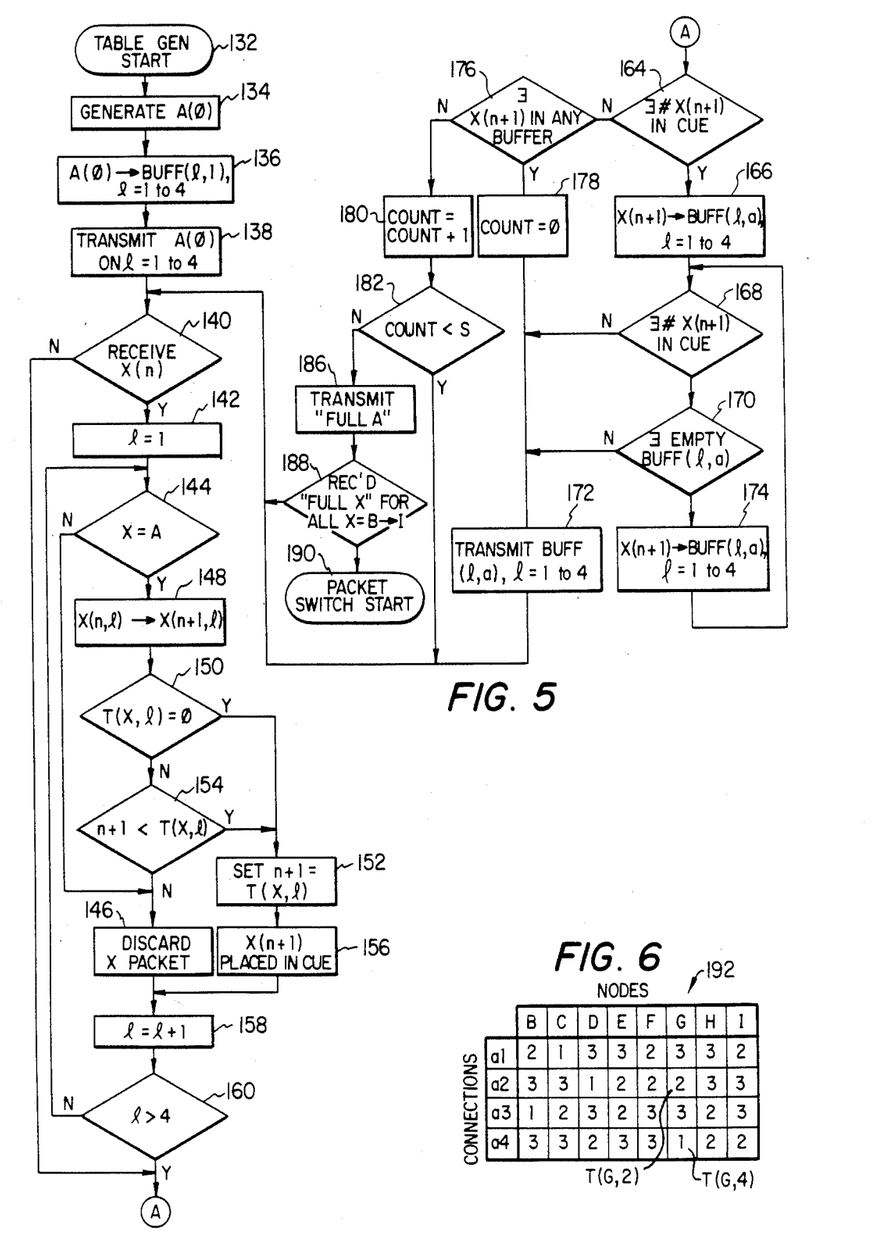
FIG. 5 is a flow diagram showing one embodiment of the look-up table generation procedure of the invention.
FIG. 6 is a conceptual representation of a look-up table for node A in FIG. 2.

FIG. 5 is a schematic flow diagram for the table generation software stored in RAM 116. It should be noted that a look-up table sufficient to operate the system could be hardwired into a PROM or like device, but it is preferred that the look-up table be stored in volatile memory in order that it may be modified upon failure of one of the system's links or nodes or in the event an addition is made to the network. After power up at step 132, each node in the system will generate a node distance packet at 134. Each node distance packet includes a node identity and a node distance number. FIG. 5 illustrates look-up table generation for node A in FIG. 2. The identity portion of a node distance packet generated at A is "A". At the time of node distance packet generation, the node distance number is zero.

After the node distance packet is generated, the generating node will put the node distance packet in a buffer of each of links 34, 56, 58, 60 (FIG. 3) at step 36. At step 138, the node transmits the node distance packet to adjacent connected nodes on each of its output lines. Simultaneously with the transmission of the node distance packets, node A will receive four node distance packets from its neighbors on the input lines at 140. This step is shown as a decision because later in the table generation process node A may not receive any node distance packets. Received node distance packets are generally noted in FIG. 5 as X(n), where X is the originating node identity and n is the node distance number of the node distance packet as received.

If any node distance packets are received, CPU 48 (FIG. 3) will read them serially starting with the first link at 142. At 144, CPU 48 asks whether the received node distance packet was generated by itself. If X is equal to A, CPU 48 will discard the node distance packet at 146. If X does not equal A, the node then increments the node distance number of the node distance packet by a constant, preferably one, at 148. The packet is also associated with the input line l on which it appeared.

At decision 150, CUP 48 looks at its look-up table in RAM 116 (FIG. 3) at the entry corresponding to node identity and input line l. An entry in the total at T, (X,l) corresponds to a distance to node X on a path including output line l. If the entry is zero, indicating that no information has yet been received corresponding to that entry, the entry is set to n+1 at 152. If entry T(X,l), is non-zero, the node distance number n+1 of the packet (n+1, l) is compared at 154 to the corresponding table entry T(x,l). If the node distance number is less than the existing table entry, n+1 is set equal to the entry at step 152. Otherwise, node distance packet X(n+1, l) is discarded at step 146.

Where a node distance number n+1 of a packet has been set to a look-up table entry, the node distance packet X(n+1) is dissociated from line l, preserved and is placed in a transmission cue at step 156. As incremented, the node distance packet will be transmitted on all lines to adjacent nodes, thereby passing on correct information as to how far away node X is by the path taken by X(n+1). On the other hand, if node distance packet X(n+1) has a node distance number n+1 less than that already present in the table at node T(X,l), it shows that the path taken by X(n+1, l) is not the shortest path to node X that includes line l. Therefore, the node distance packet is discarded.

At 156, X(n+1) is placed in a queve instead of directly into a buffer because, during the table generation process, the number of node distance packets to be transmitted on the output lines soon exceeds the number of buffers available to store data. For instance, during the first system clock cycle, node A will receive node distance packets D(0), G(0), D(0) and C(0) (See FIG. 2). After the distance number of these node distance packets is incremented by one, the node distance packets will be D(1), C(1), D(1), and G(1). An entry of one will be placed in the look-up table at T(D,2); T(G,4); T(D,3) and T(C,1). Since all of the node distance packets received during the first clock cycle are used to supply information to the look-up table, none of these node distance packets is discarded and therefore all will be retransmitted. As replicated four times, the node distance packets received during the first clock cycle therefore will by themselves occupy all 16 available storage buffers in awaiting for retransmission. Subsequent valid (undiscarded) node distance packets in excess of one are therefore stored in a queve pending the opening up of buffers.

At step 158, the receiving link l is incremented by one and the line number is tested to four, the maximum link number, at 160. (Link l and input line l are associated structures, as shown by FIG. 3.) If one or more links have yet to be looked at, the table generation procedure returns at 160 to step 144 and repeats the process for the remaining links. If all links have been searched, the procedure then proceeds to step 164 (right side of figure), and asks whether any incremented node distance packet (X(n+1)) is present in the transmission queve. The "no" branch from decision 140 also branches to this set. If there exists an X(n+1) in the transmission queve, as will be the case during most of the procedure, a distance node packet X(n+1) at the top of the queue is placed in one buffer on each link at step 166 so that the distance node packet can be retransmitted on each output line X(n+1) is thus replicated four times before being transmitted. The procedure then asks at step 168 whether there are any further node distance packets in the transmission queve. If there are, step 170 determines whether or not there are any remaining buffers (Buff,(-l,a)) to hold the further queved node distance packets. The number of empty buffers will be a multiple of four, as the buffers are filled and emptied four at a time, one per link "a" is the buffer number, and varies from one to four. If there are, no further node distance packets in the transmission queve, or if there are no further empty buffers to contain such node distance packets, the contents of buffer (a) in each link (l) will be transmitted to all adjacent nodes at step 172. If there are further empty buffers, further node distance packets will be placed in them at step 174 and the procedure will loop back to step 168.

Figure 7:
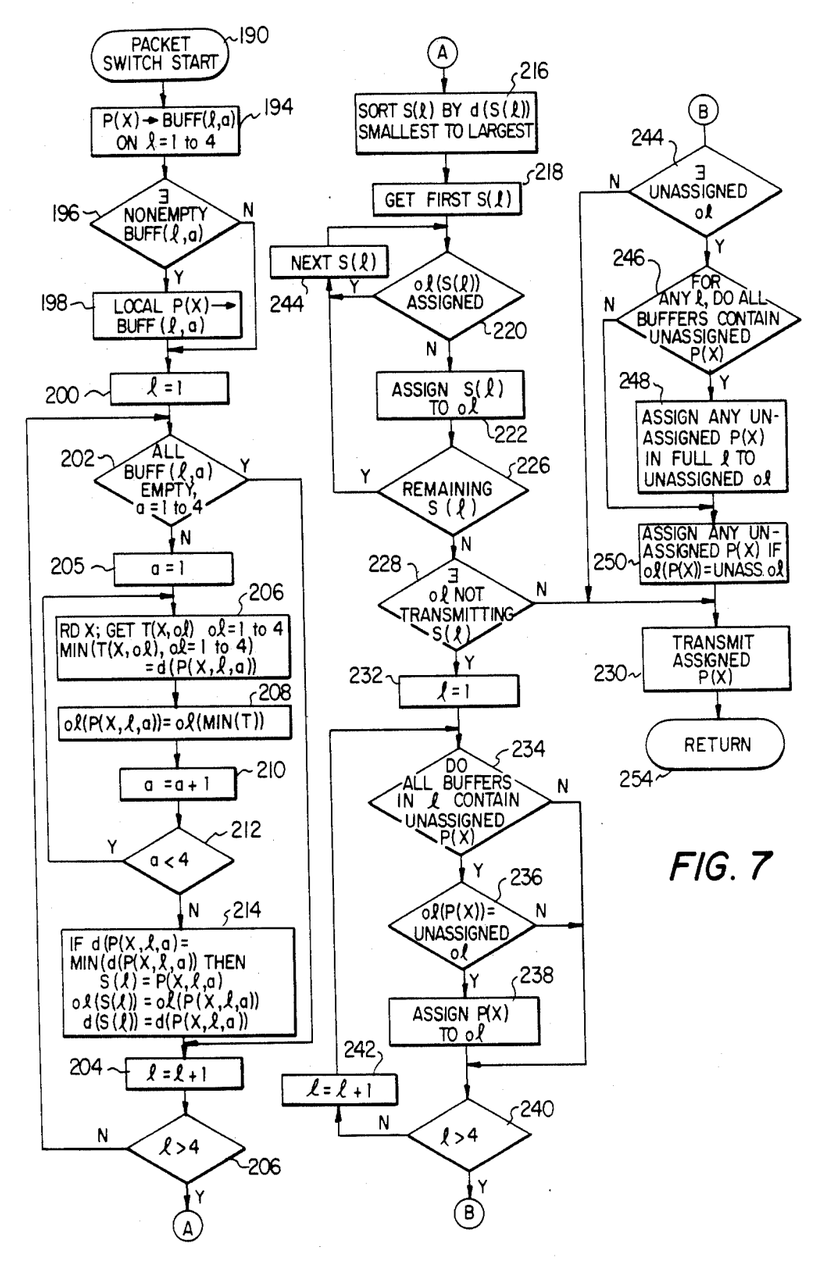
FIG. 7 is a flow diagram of one embodiment of the user packet switching procedure of the invention.

If no node distance packets are found in the transmission queve at 164, the procedure branches to step 176, which begins a subprocedure to find out whether any active node distance packets are still being transmitted within the nextwork. Step 176 asks whether any node distance packet X(n+1) is present in any buffer in any link. If one or more node distance packets are ready for retransmission, a count variable is set at zero at step 178 and the found node distance packets are retransmitted at step 172. If no node distance packets are found in the buffers, COUNT is incremented by one at step 180 and compared to an arbitrarily set constant S in order to determine how many cycles have elapsed without the node retransmitting a node distance packet. S is set so that, when queve backups are taken into consideration, node distance packets transmitted on all lines from the node having the largest logical separation are able to reach the subject node (here, Node A). If COUNT is less than S at 182, the procedure returns to step 140 to begin the next cycle in the table generation procedure. The procedure also returns to 140 after transmission of the contents of one group of four buffers at 172. If COUNT is greater than or equal to S at 182, indicating that no node distance packets have been transmitted for a number of cycles, a "full A" packet is transmitted at 186, indicating that Node A's look-up table is finalized. Step 188 tests whether the node has received similar "full B", "full C", etc., packets from each other node in the system. If such is not the case, the procedure returns to 140 to begin another cycle. However, if "full X" packets have been received for each node in the system, it is an indication that all look-up tables in the network have been finalized and the network is ready to begin switching user packets at 190. The packet switching procedure shown in FIG. 7 is then employed.

At node distance packet transmission step 172, buffer "a" is selected preferably in sequence, i.e., if buffer number one for each link one through four is selected in the first cycle for transmission, buffer two would be selected for transmission in the second cycle, etc. This pattern would repeat in order to assure that no destination node packets are transmitted out of sequence of their receipt. The efficiency of table generation is thereby increased because the node distance packets evidencing the shortest logical routes will arrive at Node A first, with node distance packets that have taken more circuitous paths arriving later. The transmission mnemonic could also be somewhat improved by not transmitting the node distance packet back to the node from which the node distance packet was received, as that retransmitted node distance packet would merely be discarded by the source node. However, this logical refinement requires further overhead to execute and may thus not be desirable to institute in many instances.

FIG. 6 is a conceptual diagram of a completed look-up table 192, stored in RAM element 116 (FIG. 3). The look-up table shown in FIG. 6 corresponds to the relatively simple, two dimensional hypertoroidal network shown in FIG. 2 and would of course be expanded for a network having additional dimensions or nodes. The completed table shows the shortest logical distance to the referenced node along the referenced output line. Corresponding to a user packet being transmitted out of output line 28 (part of full duplex line a2) and having a destination node G, the entry (T(G,2)) is equal to two node distances. Entry T(G,4) shows that it is more economical to send a G packet out line 1, as Node G is only one node distance away by that route.

Although a hypertoroidal network is preferred for minimum logical distance growth, the look-up table exemplified by FIG. 6 could also be generated for any multinode system architecture.

Once a look-up table 192 is generated for each node, the network is ready to switch user packets from local devices 124 (FIG. 3) onto the network. Used herein, "user packet" means a packet of fixed, constant length of user program material containing data and/or instructions. During each packet switching clock cycle of the user program operation, any of nodes 10 (FIG. 2) will receive user packets P(X) on any of input lines one through four (18, 20, 22, and 24; FIG. 3) and will be stored in links 34, 56, 58 and 60 in an empty buffer selected by CPU 48. The packet switching procedure operates such that there are always at least four buffers, one buffer per link, in an empty condition ready to receive a user packet.

Referring to FIG. 7, user packets are input into four empty buffers one per link l, at step 194. Step 196 then asks whether there is still a non-empty buffer after receipt of user packets from other nodes. If one or more non-empty buffers do exist, user packets P(X) of local origin are put into one or more empty buffers from local device 124 (FIG. 3). Referring back to FIG. 3, a local user packet is switched into one of the buffers in link 34, 56, 58 or 60 through the action of crossbar 122 and controller 98.

Whether a locally originated packet can be placed in an empty buffer or not, variable l is set to one at step 200. Next, step 202 checks to see if all buffers in the inspected link are empty at step 202. If all of the link's buffers are empty, the program branches to step 204, where the link number is incremented at step 204, tested to see if the link number exceeds the maximum at 206 and the next link in numerical sequence is inspected at 202. If a non-empty link is located, buffer variable "a" is set to one at 205. At 206, the destination node in the packet header is read from buffer latch 74 (FIG. 4). Then, entries T(x,ol), ol=1 to 4 in the look-up table for the packet's destination node X are retrieved. As used for FIG. 7, ol is an output line variable ranging from one to four. The minimum logical distance is next determined by picking the minimum of T(x,ol) and equating it to the distance (P(X,l,a)) that the user packet in buffer (l,a) has left to travel. At step 208, the output line ol preferred by user packet P(X,l,a) is set equal to the output line giving the minimum distance in table T.

At step 210, buffer a is incremented by one and is compared to the number of buffers in each link (here, four) at step 212 to check if the possible number of buffers has been exceeded. If "a" is less than four, the process of determining (P(X,l,A)) and ol;(P(X,l,A)) is repeated for each buffer within the link. When step 212 determines that all of the buffers in the current link have been inspected, one of the user packets stored in the link having the smallest "d" is selected as a member of a set S at step 214. User packets belonging to set S get first priority in the assignment of output lines for transmission to adjacent nodes. Each member of S(l) is associated with an output line ol(S(l)) equivalent to the preferred output line of the chosen stored user packet, and has a nodal distance d(S(l)) equivalent to the nodal distance of the chosen user packet.

Once a member of S is chosen for the current link l, the link number is incremented by one at step 204 and compared against the total number of links in the node at step 206. If the link number is less than the total number of links in the node, the process repeats to select further members of set S.

Upon completion of the selection of members of set S, the members are sorted at step 216 (top) according to the nodal distance "d" to their respective destination nodes, from smallest to largest. At 218, the member of S(l) having the smallest "d" is retrieved. Step 220 determines whether the output line preferred by the retrieved user packet has been assigned yet. If not, the output line is then assigned at step 222 by placing S(l) at the top of the transmission cue for that output line. If the retrieved member of S(l) has a preferred line which has already been assigned, the procedure considers the member of S(l) having the next smallest "d" at 224.

By steps 216-224, therefore, from one to all of the members of S(l) are assigned to output lines, depending on the availability of those output lines for transmission. The member of S(l) having the shortest nodal distance to its destination will certainly be assigned to an output line and transmitted during the current system clock cycle. Whether succeeding members of S(l) are assigned to output lines depends on whether those output lines have been previously assigned to previously-considered members of S(l).

Step 226 asks whether there are any remaining members of S(l) to be considered. If there are, the procedure returns to step 224. If there are not, the procedure goes to the next phase of user packet selection for transmission at decision 228, which asks whether any unassigned output lines remain after the members of S(l) have been assigned to them. If no output lines remain unassigned, four assigned user packets are ready for transmission and the procedure branches to transmission step 230.

If there are remaining unassigned output lines, a second phase of the user packet selection procedure first sets l to one at step 232. The procedure inspects the current link at 234 to determine whether or not all of its buffers contain unassigned user packets. If the current link is "full", i.e., all of its buffers contain unassigned user packets, step 236 determines whether any of the unassigned user packets have a preferred output line equivalent to an unassigned output line. If so, the matched user packet is assigned its preferred output line at 238. Then link number is compared to the maximum number of links at 240. If all of the links have not yet been considered, the link number is incremented by one at 242 and the next link is considered at 234.

If all of the links have been considered by this phase of the assignment program, a third phase of user packet assignment begins at step 244, which asks whether any unassigned output lines remain. If not, the procedure branches to transmission step 230. If there are remaining unassigned output lines, then step 246 inspects each link to determine if any of them are full. If one or more full links remain, the program assigns at 248 any unassigned user packet in the full link to an unassigned output line, without considering whether the preferred output line of the user packet is the same as the unassigned output line. This phase ensures that at least one empty buffer will be available in each link to receive incoming data upon the next packet switching clock cycle. If at 246 it is determined that each link has one empty buffer or one buffer containing an already assigned information packet, the procedure branches to step 250 where all remaining information packets are assigned if their preferred lines are equivalent to any unassigned output line. After step 248 of the other branch, the program once again asks whether any unassigned output lines remain; if there are, the program goes to step 250. Otherwise, the program branches to transmission step 230.

After step 250 has been completed, or in the case that the unassigned output lines have been exhausted before step 250, the assigned information packets are transmitted on their respective assigned output lines at step 230. Step 230 is simultaneous with the receipt of further information packets on input lines a1–a4. Thus, although for purposes of description step 230 and step 194 are conceptually separated by return 254, the transmission step 230 of a previous packet switching cycle occurs simultaneously with the receipt of information packets at 194 in a subsequent packet switching cycle. Referring back to FIG. 4, this is possible because, if buffer 38 is the only empty buffer in link 34, an incoming packet will input serially into register 72 at the same time that an outgoing packet is being serially outputted on line 86 out of shift register 76. Thus, no space conflict between the packets occurs.

The above-described packet switching procedure may be summarized as follows:

1. First, a set S is constructed from the closest information packet (in terms of distance to its destination node) in each link. The packets in S are placed in a sequence according to their associated distances "d", from closest to farthest. The packets in 5 are then assigned to output lines taken in this sequence. If a packet S has a preferred output line that has already been assigned that packet is passed over in this step.

2. If there are still some output lines available, the program looks at each link's buffers. Each link must keep at least one buffer available to receive a possible incoming packet. If there is any link that needs to free a buffer for this purpose ("full" links), this step assigns an available output line to any packet in that link's buffer that prefers the output line.

3. If there are still both output lines available and "full" links, the procedure next assigns any packet in a "full" link to any available output line, regardless of the assigned packet's preference.

4. If there are still output lines available, the procedure selects any packet that prefers any unassigned output line.

Figures 8, 9, 10, 11:
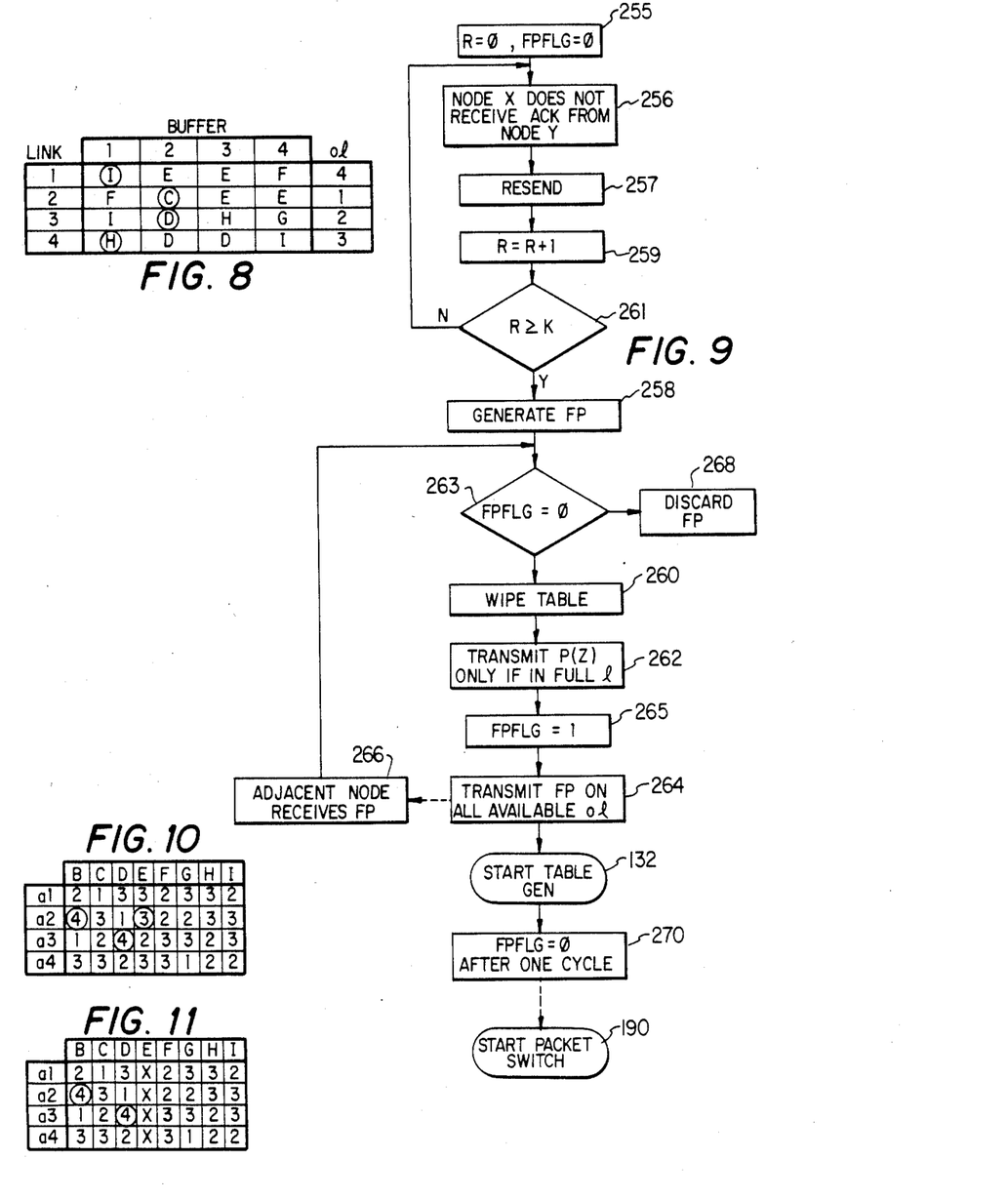
FIG. 8 is a conceptual representation of Node A of FIG. 2, showing all buffers filled.
FIG. 9 is a flow diagram of the fault detection and table regeneration procedure of the invention.
FIG. 10 is a conceptual representation of the look-up table for Node A in FIG. 2, showing changes in the entries due to a fault in the D-E link.
FIG. 11 is a conceptual representation of a routing table for node A in FIG. 2, showing changes to the table due to the failure of node E.

FIG. 8 is a conceptual diagram of a completely full set of links in Node A of FIG. 2. Each buffer contains a user packet including a header having a destination node identifier. For example, buffer (2,4) has a packet destined for Node E. The circled data packets are selected for transmission on the nodes output lines as follows.

During the first user packet selection stage (steps 196–228, FIG. 7) set S is formed from the data packets in each link having the smallest distance "d". This can be determined by referring to the look-up table of FIG. 6. Ties go to the first packet of two considered.

For link 1, $S(1)=P(I,1,1)$, as d $(P(I,1,1))=2$, a distance at least as small as those available for packets E or F. $ol(Pa(I,1,1))$, the output line giving the smallest distance, is 1. Therefore $d(S(1))=2$ and $ol(S(1))=1$. Similarly, $S(2)=P(C,2,2)$, $d(S(2))=1$, $ol(S(2))=1$; $5(3)=P(D,3,2)$, $d(S(3))=2$, $ol(S(3))=2$; and $S(4)=P(D,4,2)$, d $(S(4))=2$, $ol(S(4))=2$.

Next, the members of S are arranged in the order of smallest to largest distance S(2), S(3), S(4), S(1).

Then, the members of S are sequentially assigned to ouput lines. S(2) is assigned to output line 1. S(3) is assigned to output line 2. S(4) is not assigned, as its preferred output line has already been assigned to S(3). S(1) is passed over because its preferred output line has already been assigned to S(2).

After the first data packet selection stage, there are still two unassigned output lines (3 and 4). Therefore, the second user packet selection stage is entered into (steps 232–242, FIG. 7). Links 1 and 4 are still "full". In link 1, the preferred output lines for the stored packets are as follows: $ol(P(I,1,1))=2$; $ol(P(E,1,2))=2$; $ol(P(E,1,3))=2$; $ol(P(F,1,4))=1$. In the basic illustrated algorithm for selection of the preferred output line, ties go to the first output line considered. Thus, for $P(E,1,2)$, either line 2 or 3 gives the minimum distance "d" of 2, but line two will be chosen over line 3. A more complicated line selection algorithm could throw out previously selected lines as possible choices; in the last example, this improvement would cause $ol(P(E,1,2))=3$ instead of 2.

As it is, however, no packet is found in Link 1 whose preferred output line equals an unassigned output line. In link 4, the other "full" link, the preferred output lines are $ol(P(H,4,1))=3$; $ol(P(D,4,3))=2$; $ol(P(D,4,3)=3$; $ol(P(I,4,4))=1$. Line 3 is unassigned, and therefore is assigned to P(H,4,1). The remainder of the packets in link 4 prefer already assigned lines.

At the end of stage 2, there is still a "full" link (link 1) and an unassigned line (output line 4). Steps 244 and 246 (FIG. 7) therefore force the packet selection procedure into a third state (step 248). The packet in the first buffer of link 1 (P(I,1,1) is taken and assigned to output line 4 for transmission without considering the preferred line for a packet with destination I. Fortunately, line 4 is as good a choice as preferred line 1 (See FIG. 6).

Since all output lines have been allocated to packets, the mode is ready to transmit at the start of the next clock cycle at step 230. FIG. 8 shows the packets to be transmitted in circles and their respective assigned output lines in the rightmost column.

FIG. 9 is a flow diagram of the fault packet generation subroutine entered into when a node or a line in the system fails. At system startup 255, a resend incremented variable R is set to zero and a fault packet flag FPFLG is also set to zero. At 256 a Node X notes a failure to receive an acknowledgement code from an adjacent Node Y after X has transmitted a packet to Y. This causes Node X to resend the packet at 257 and to increment R at 259. R is compared against a predetermined constant K at 261. If R is less than K, the resend procedure loops to step 256. If R is greater than or equal to K, a fault packet FP is generated at step 258.

The node checks whether FPFLG=∅ at 263. On the first pass, FPFLG will equal zero and the node therefore wipes its look-up table at 260. Wiping the look-up table is necessary because its entries are valid for the system condition previous to the fault only. The failure of a line or node will change several values in the table (see FIGS. 10 and 11).

At 262, most of the packet transmission procedure outlined in FIG. 7 is short circuited. Until all look-up tables are generated, user packets P(Z) will only be transmitted to empty one buffer in a full link, and then without reference to the packet's preferred line, per step 248 in FIG. 7. Since the other packet selection stages (214–222), (234–242), (250) in FIG. 7 use the look-up table, they are bypassed.

FPFLG is set to 1 at 265. Fault packets are transmitted on all output lines as they become available at 264. Adjacent nodes each receive a fault packet at 266, and they copy the procedure undergone by the sending node starting at 263. This eventually erases all look-up tables in the system.

After a node has already wiped its look-up table, it will most likely receive further fault packets at step 266. However, because FPFLG has been set to 1 at 265 for such a node, the procedure branches at 263 to step 268 instead of rewiping the look-up table at 260. The received fault packet is discarded and not retransmitted at 268. This branch will eventually eliminate all fault packets in the sywtem.

After a node has transmitted fault packets at 264, it will begin to regenerate its look-up table at 132 after the table generation procedure shown in FIG. 5. At 270, FPFLG is set back to 0 to rearm the subroutine after one system clock cycle. The step is taken after one cycle in order for the system to have purged all current fault packets near the node. After all look-up tables are regenerated, the program returns to the user packet switching procedure of FIG. 7 at 190.

FIG. 10 conceptually shows a look-up table that has been regenerated according to the procedure diagrammed in FIG. 9. In this case, line el (see FIG. 2) between Nodes D and E has failed, and Node D is unable to get a response from Node E that an information packet has been received. This causes the tables of Nodes A-I to be wiped, and the table regenerated as shown in FIG. 10, the circled entries are those that have changed show the values as a result of the line failure.

FIG. 11 conceptually shows what happens when an entire node, in this case Node E of FIG. 2, fails. In this case, since no node distance packets can emanate from E upon table regeneration, none of the regenerated tables of the remaining nodes will have any entries concerning Node E. Node E has effectively been taken out of the network. An executing program requiring the use of a device locally connected to node E will crash. However, assuming that the function provided by Node E's local device is duplicated elsewhere in the network, the program can be modified and reloaded without any hardware repair to the network necessary.

In both FIGS. 10 and 11, it should be noted that certain node distance values (a2B, a3D) change even though they do not have any thing directly to do with Node E. This is why regeneration of all look-up table entries is necessary.

In summary, a routing procedure and node architecture is disclosed for a multinode interconnection network, and specifically for a hypertoroidal interconnection network, which efficiently switches user packets among the nodes in the system. The routing procedure is so constructed that static and dynamic grid lock are avoided. As used, the network exhibits an effect analogous to a gravitational field with respect to a user packet and its destination node: as the user packet gets closer to the destination node, it tends to be more and more preferentially chosen for transmission increasing its overall internodal velocity (number of switches/cycle). As mentioned, the routing procedure and nodal architecture disclosed herein may be used for a network having other than a hypertoroidal architecture. All that is required is that the nodes have an equal number of inputs and outputs and that their connecting lines be in a full duplex configuration.

Various improvements may be made to the basic algorithms shown. For example, a set of transmission cues, one for each output line, may be established as a portion of the user packet switching procedure. A user packet would then be assigned a transmission priority only once, instead of at each system cycle. However, such a cue, in common with other improvements, tends to increase the complexity of the algorithm and thus system overhead.

The routing procedure and nodal architecture described herein also provide a "fail-soft" system network. The failure of one or more lines generally will only increase computing time by a certain amount, and even the failure of an entire node will not require subsequent hardware repair in order for the network to operate.

Although an illustrated embodiment of the present invention has been described in detail, it should be understood that various changes, substitutions and alterations can be made therein without departing from the spirit and scope of the invention as defined by the appended claims.

What is claimed is:

1. A method for routing user packets in an interconnect network, the interconnect network having a plurality on nodes each having a plurality of output lines and packet storage, each user packet having a destination node, the method comprising the steps of:

receiving a number of packets into a first node;

storing the packets;

sensing the destination node of at least one stored packet;

determining a preferred output line for the stored packet, the preferred output line being associated with the shortest nodal travel distance to the destination node, wherein each output line is associated with an input line, including the steps of:

originating a plurality of node distance packets at each node in the network, each node distance packet including a node identity and a distance number originally set to a base value, transmitting the node distance packets from each node to connected nodes, receiving the node distance packets by each node from connected nodes via input lines, at each node, incrementing the distance number of each received node distance packet by a constant, setting a value of a corresponding nodal distance array member to the distance number from each incremented distance packet, the array member being referred by the node identity and the output line associated with the input line on which the distance packet was received, retransmitting from each node to connected nodes the incremented distance packets, receiving the incremented distance packets by each node, at each node, further incrementing the distance number of each received incremented distance packet, at each node, comparing the further incremented distance number of each distance packet to the value of a corresponding array member, discarding any further incremented distance packet whose distance number equals or exceeds a nonzero value of the corresponding array member to the distance number, at each node, retransmitting the nondiscarded distance packets to all connected nodes, repeating the incrementing, comparing, discarding, setting and retransmitting steps until no nondiscarded node distance packets remain;

choosing the array member having the shortest nodal travel distance from all array members referenced by the destination node;

setting the preferred output line of the packet to the output line referencing the chosen array member; and transmitting the packet on its determined preferred output line.

2. The method of claim 1, further including the steps of:

during operation, sensing by a node of a failure by a connected node to receive a user packet;

erasing all present values in the nodal distance array of the sensing node in response to the failure;

sending a fault packet by the sensing node to all connected nodes in response to the failure;

erasing the nodal distance array of each node receiving a fault packet;

retransmitting the fault packet by each receiving node to further connected nodes and erasing the nodal distance arrays of the further connected nodes in response to fault packet receipt, the process continuing until all nodal distance arrays in the network have been erased; and regenerating the nodal distance array of each node by generating, receiving, incrementing, comparing, discarding, setting and retransmitting node distance packets in a manner similar to originating the nodal distance arrays.

3. A method for routing user packets in an interconnect network, the interconnect network having a plurality of nodes each having a plurality of output lines and packet storage, each user packet having a destination node, wherein each node has a plurality of packet storage links, each having a plurality of packet storage buffers, an input line being connected to each link, the method comprising the steps of;

receiving a number of packets into a first node;

storing each received packet in a buffer;

sensing the destination node of at least some stored packets:

determining a preferred output line and an associated nodal travel distance to a packet,s destination node for each stored packet;

for each link having at least one nonempty buffer, selecting a packet having the shortest nodal travel distance of all the packets stored in the link;

assigning the selected packets, in increasing order of nodal travel distance, to their preferred output lines, if the preferred output line for a first packet has not already been assigned to another first packet;

after assigning the selected packets, identifying which links would still be full after transmission of the assigned selected packets if any output lines remain unassigned;

for each prospective full link, if any output lines remain unassigned, assigning a packet stored in the link to an unassigned line until the unassigned output lines are exausted or until no prospective full link remains; and transmitting ones of the portion of stored packets on their respective preferred output lines.

4. The method of claim 3 further including the step of:

if any output lines remain unassigned after the step of assigning packets from prospective full links, assigning unassigned packets to their respective preferred output lines if available, until no unassigned preferred output lines remain or until each link has an assigned packet.

5. The method of claim 4, further including the steps of:

after identifying the prospective full links, assigning unassigned output lines to second packets stored in the prospective full links, each assigned second packet having a preferred output line equal to an unassigned line; and identifying which links would remain full after transmission of the selected and second packets.

6. An interconnect network for transmission of user packets including a plurality of nodes, each node being connected by input and output lines to a plurality of other nodes, each node comprising:

means for receiving a plurality of user packets each having a destination node;

means for storing received packets;

means for sensing the destination node of each stored packet;

means for determining a preferred output line for each stored packet, said preferred output line being connected to a path having the shortest nodal travel distance to said storage packet's destination node;

means for assigning stored packets to their respective preferrred output lines, said means selecting packets for assignment according to the increasing order of the packets, respective nodal travel distances; and means for transmitting said packet on its preferred output line;

wherein said sensing means, determining means and assigning means comprise processor means, said processor means including memory means for storing a set of packet routing rules, and wherein said node includes a plurality of links each comprising a plurality of said packet storage means, said routing rules, after selecting user packets for transmission according to their nodal travel distances and availability of preferred output lines, selecting packets for transmission on and remaining available output lines according to whether each said link prospectively has at least one empty packet storage means, said routing rules preferentially selecting one or more stored packets within prospectively nonempty links for transmission on the remaining available output lines.

7. The network of claim 6, wherein:

said memory means further includes a look-up table giving the nodal travel distance to any node as measured from any output line;

said links each communicating to an input line, each packet storage means comprising a buffer capable of storing a user packet, each buffer being selectively connectable to an output line;

said routing rules assigning user packets stored in said buffers in a plurality of steps including a first step and a second step;

said routing rules in said first step selecting, for each link storing one or more user packets, one of the user packets having the shortest nodal travel distance to comprise a first set of packets;

said routing rules further in said first step assigning, for each packet in said first link, in increasing order of said packets' nodal travel distances, a preferred output line, unless said output line has already been assigned to a packet in said first set; and said processor means in said second step inspecting each link to determine whether all buffers in any link are full, said routing rules assigning one packet from a full link to any available output line until there are no more full links or until all output lines have been assigned to packets.

8. The network of claim 7, wherein:

said look-up tables of said nodes are initialized at the beginning of operation, each said node generating its look-up table based on received distance packets originating from each other node in the network, each distance packet comprising a node identification identifying the originating node and a nodal distance number that the distance packet has travelled between its originating node and the receiving node.

9. The network of claim 8, wherein each node, during initialization of said look-up tables, originates a plurality of said distance packets, each of said distance packets originally having a nodal distance number of zero, each node transmitting one distance packet on each output line to connected nodes;

each node receiving distance packets on its input lines, each input line being paired with an output line, the pair connecting the same nodes;

the distance number of each said received distance packet being incremented by one by said receiving node;

said receiving node next comparing said incremented distance number to a numerical entry in said look-up table, said entry being referenced by the output line paired with the input line on which said distance packet appeared and said packet's node identification;

said receiving node discarding said distance packet if said packet's incremented distance number is not less than said entry where said entry is nonzero; and said receiving node, if said incremented distance number is less than said entry or said entry is zero, setting said entry to said distance number, said receiving node then replicating said distance packet and retransmitting said distance packet on all output lines to neighboring nodes.

10. The network of claim 9, wherein:

each node is capable of sensing a failure of connected node to receive a packet transmitted to said connected node by said sensing node;

said sensing node erasing its look-up table in response to sensing said failure;

said sensing node transmitting a fault packet on each of its output lines to connected nodes in response to said failure;

said connected nodes erasing their look-up tables and likewise retransmitting said fault packets, until all nodes in said network have erased their look-up tables; and each node reconstructing its erased look-up table in a manner similar to the original generation of said look-up table.

11. The network of claim 7, wherein:

each said link is connected to an interior output line, said interior output lines each connecting to a crossbar, said crossbar terminating a plurality of exterior output lines; and said processor means selecting up to one packet stored in a link to communicate to said crossbar on said link's interior output line, said processor means directing said crossbar means to communicate said selected packet to one exterior output line.

12. The multinode interconnect network of claim 11, wherein:

said exterior output lines include a plurality of output lines connected to other nodes and a local output line to a local device interface;

said processor means directing said crossbar means to communicate up to one user packet stored in a link with said local output line, said packet having a destination node equal to said packet's present location; and said links being selectively connected to also receiving a local packet input path from said device interface, said processor means selecting up to one buffer for receiving and storing a local packet.

13. The network of claim 11, wherein:

each said link includes a demultiplexer selecting one of said buffers for receipt of a packet in response to a command from said processor means, said demultiplexer having one of said input lines connected to its input;

each said link further including a multiplexer selecting one of said buffers for transmission of a packet stored in said buffer to said crossbar in response to a command from said processor means; said multiplexer having an output terminal connected to an interior output line; and said processor means being connected to each said buffer so as to be capable of reading data from and writing data into said buffer.

* * * * *